No. 750,726. PATENTED JAN. 26, 1904.
J. P. STEVENS.
FERTILIZER DISTRIBUTER AND SEED DRILL.
APPLICATION FILED OCT. 29, 1903.
NO MODEL.
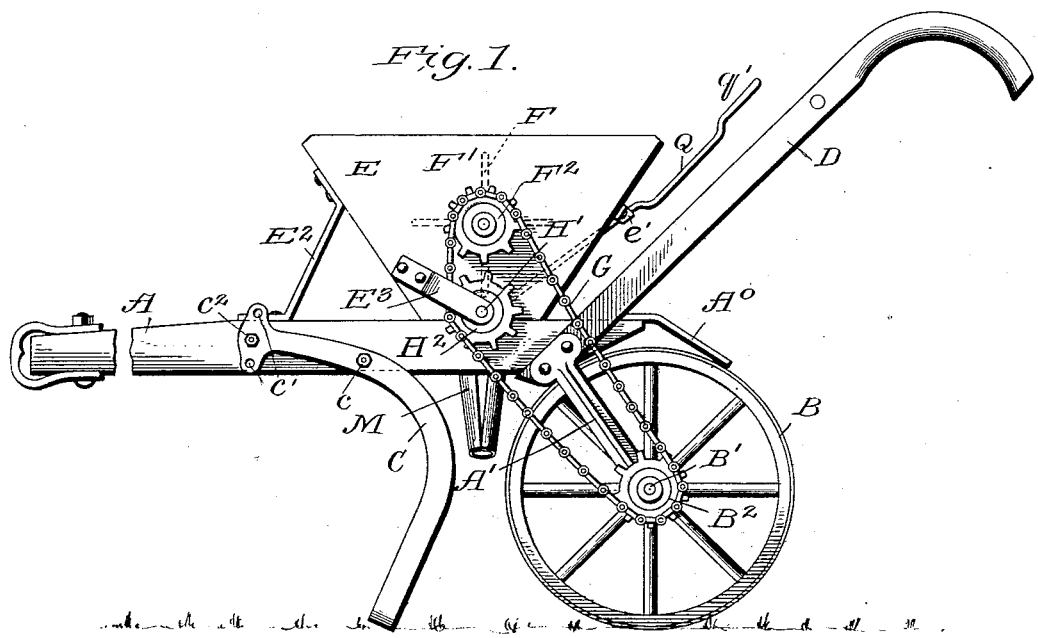
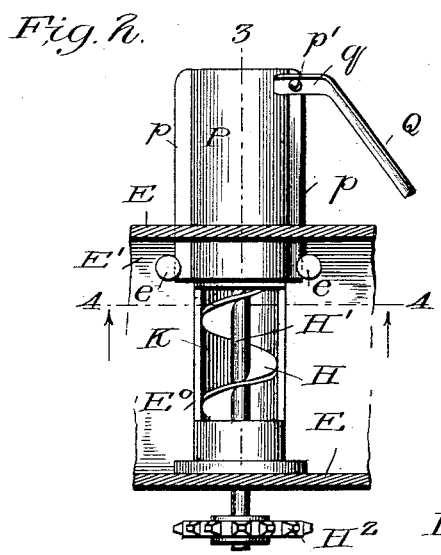
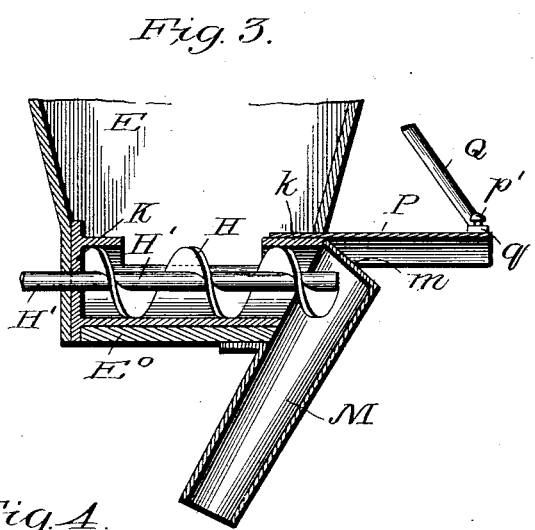
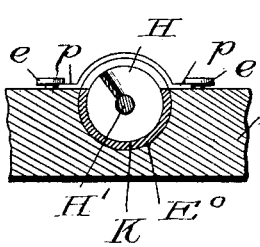
Witnesses
Inventor,
J. P. Stevens,
Attorneys.

No. 750,726. Patented January 26, 1904.

UNITED STATES PATENT OFFICE.

JOSIAH PERCIVAL STEVENS, OF ATLANTA, GEORGIA.

FERTILIZER-DISTRIBUTER AND SEED-DRILL.

SPECIFICATION forming part of Letters Patent No. 750,726, dated January 26, 1904.

Application filed October 29, 1903. Serial No. 179,084. (No model.)

*To all whom it may concern:*

Be it known that I, JOSIAH PERCIVAL STEVENS, a citizen of the United States, residing at Atlanta, in the county of Fulton and State of Georgia, have invented certain new and useful Improvements in Fertilizer-Distributers and Seed-Drills; and I do hereby declare the following to be a full, clear, and exact description of the invention, such as will enable others skilled in the art to which it appertains to make and use the same.

My invention relates to improvements in fertilizer-distributers, and is intended to provide a cheap and efficient fertilizer-distributer which is not liable to get out of order and which will distribute the fertilizer uniformly and in which the quantity distributed may be readily adjusted.

With the fertilizer-distributers now in use it has been found difficult to distribute damp or wet guano or cotton-seed meal or the like uniformly, as it is apt to cake up in the machine and to be delivered intermittently.

My invention may also be used as a grain-drill by nearly closing the opening in the base of the hopper.

My invention will be understood by reference to the accompanying drawings, in which the same parts are indicated by the same letters throughout the several views.

Figure 1 is a side elevation of the implement, parts being broken away. Fig. 2 is a detail showing in plan the interior of the base of the hopper, the hopper being shown in horizontal section. Fig. 3 is a vertical section along the line 3 3 of Fig. 2, and Fig. 4 is a vertical section along the line 4 4 of Fig. 2.

A represents the framework of the machine, mounted on the wheel B, which is journaled in suitable arms A', made fast to the frame A.

$A^0$ is a scraper for the wheel B.

C represents a plow or furrow-opener, which is adjustably connected to the frame A, as by means of the bolts $c$ and $c^2$, the latter bolt being put through one of the holes $c'$, so that the furrow may be opened deep or shallow, as desired.

D represents the handles, which are of the usual construction.

E represents the hopper, which may be of any suitable size and shape and which may be braced in any convenient way, as by means of the brace $E^2$. Transversely mounted in this hopper are the shafts H' and F', on which the screw H and the stirring-arms F are mounted. $E^3$ is a bracket fast to the hopper E, which forms a journal-bearing for the shaft H'. On these shafts H' and F' are sprocket-wheels $H^2$ and $F^2$, over which passes the sprocket-chain G, which is driven by the sprocket-wheel $B^2$, fast on the shaft B', to which the driving-wheel is rigidly attached.

Beneath the hopper I provide the chamber $E^0$, in which fits the cylindrical casing K, which casing is partially cut away on top, so as to be flush with the bottom E' of the hopper, as shown in Fig. 2. This cylindrical casing is cut away diagonally at one end, as shown at Fig. 3, with its top overhanging, as shown at $k$ in said figure, and this open end of the casing delivers the fertilizer or seed into the chute M.

The opening in the top of the casing K may be partly or wholly closed by means of the slide P, which is flanged, as at $p$, and travels under suitable guides $e$. This slide carries a pin $p'$, to which is loosely connected the end $q$ of the hand-lever Q, which lever is pivoted to the hopper, as at $e'$, and is provided with a handle $q'$. (See Fig. 1.) By adjusting the position of this slide the opening for the fertilizer, through which it is drawn by the screw conveyer, may be varied at will, and thus the supply of fertilizer may be varied. If this opening be nearly closed, the implement may be used as a grain-drill.

By having the screw conveyer located beneath the stirrers in the hopper and transversely disposed the fertilizer or grain is pushed out through the end of the casing and falling down the inclined chute is delivered below the center of the hopper or into the furrow opened by the plow C. Moreover, by having the casing cylindrical and cut away at the top and also at an angle at one end the feeding-screw keeps the casing clean, pushes the fertilizer out endwise of the casing, and this fertilizer dropping over the inclined edge of the cut-away portion is evenly distributed in the chute M.

Having thus described my invention, what I claim, and desire to secure by Letters Patent in the United States, is—

1. In an agricultural implement, the combination with a frame and a driving-wheel supporting the same, of a hopper, stirrers mounted transversely in said hopper, a cylindrical casing mounted in the bottom of said hopper cut away at the top and also at an angle at one end, a feeding-screw journaled in said casing, a chute connected to the cut-away end of said casing, and means operated by the driving-wheel for rotating said stirrers and said feeding-screw, substantially as described.

2. In an agricultural implement, the combination with a frame and a driving-wheel supporting the same, of a hopper, stirrers mounted transversely in said hopper, a cylindrical casing mounted in the bottom of said hopper cut away at the top and also at an angle at one end, a feeding-screw journaled in said casing, an adjustable slide mounted over said casing to limit the feed thereto, a chute connected to the cut-away end of said casing, and means operated by the driving-wheel for rotating said stirrers and said feeding-screw, substantially as described.

In testimony whereof I affix my signature in presence of two witnesses.

JOSIAH PERCIVAL STEVENS.

Witnesses:
J. KENNEDY,
D. B. DeSAUSSURE.